(No Model.) 3 Sheets—Sheet 1.

C. W. PRICE.
AUTOMATIC CIRCUIT CONTROLLER.

No. 594,034. Patented Nov. 23, 1897.

WITNESSES:
Edward Thorpe
C. R. Ferguson

INVENTOR
C. W. Price
BY
ATTORNEYS.

THE NORRIS PETERS CO., PHOTO-LITHO., WASHINGTON, D. C.

(No Model.) 3 Sheets—Sheet 2.

C. W. PRICE.
AUTOMATIC CIRCUIT CONTROLLER.

No. 594,034. Patented Nov. 23, 1897.

WITNESSES:
Edward Thorpe
C R Ferguson

INVENTOR
C. W. Price.
BY
[signature]
ATTORNEYS.

(No Model.) 3 Sheets—Sheet 3.
C. W. PRICE.
AUTOMATIC CIRCUIT CONTROLLER.
No. 594,034. Patented Nov. 23, 1897.
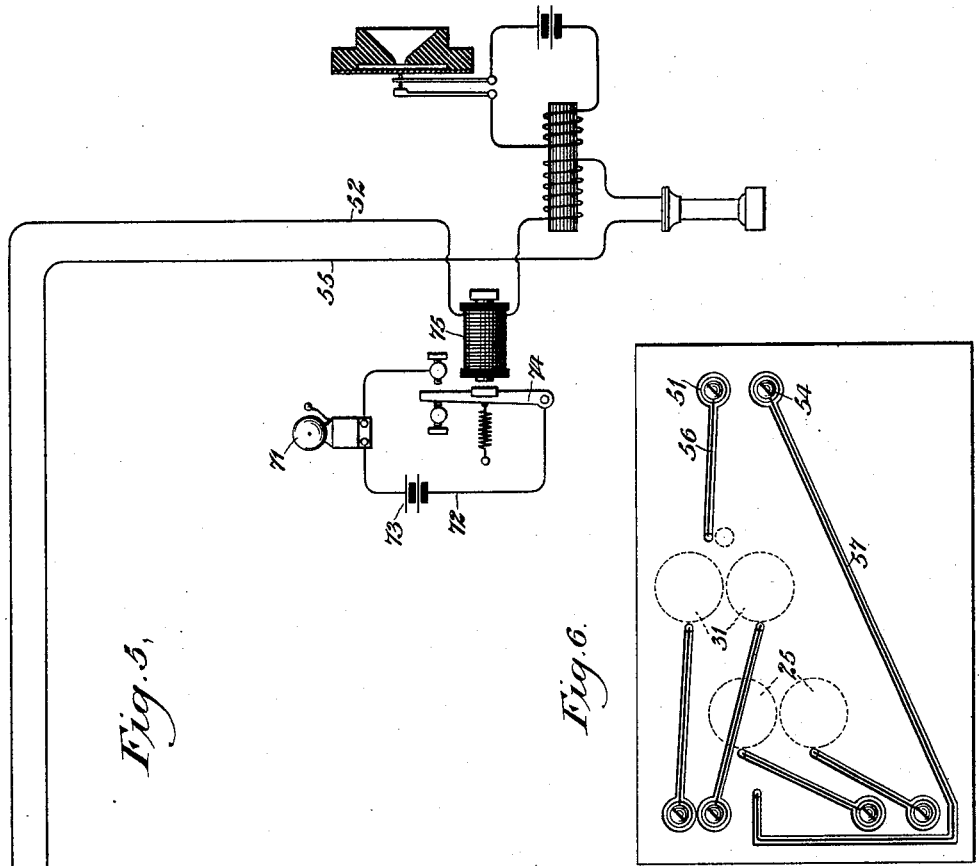
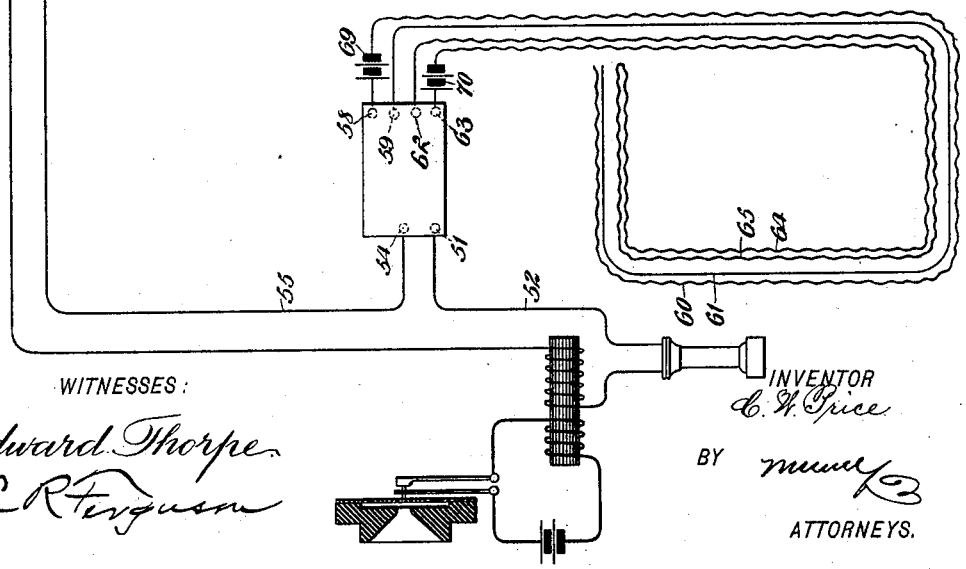
WITNESSES:
Edward Thorpe
C R Ferguson
INVENTOR
C. W. Price
BY
ATTORNEYS.

United States Patent Office.

CHARLES W. PRICE, OF NEWARK, NEW JERSEY, ASSIGNOR, BY MESNE ASSIGNMENTS, TO THE MONTAUK MULTIPHASE CABLE COMPANY, OF NEW YORK, N. Y.

AUTOMATIC CIRCUIT-CONTROLLER.

SPECIFICATION forming part of Letters Patent No. 594,034, dated November 23, 1897.

Application filed March 23, 1897. Serial No. 628,859. (No model.)

*To all whom it may concern:*

Be it known that I, CHARLES W. PRICE, of Newark, in the county of Essex and State of New Jersey, have invented a new and Improved Automatic Electromechanical Circuit-Controller, of which the following is a full, clear, and exact description.

This invention relates to devices for automatically controlling electric circuits to sound an alarm at a central office, indicating danger from any source—such, for instance, as signaling the existence of a fire in a building or the presence of a burglar; and the object is to provide a single machine by means of which two or more danger local circuits may be controlled, and, further, to provide a simple means whereby the circuit-controller will be automatically stopped.

I will describe a circuit-controller embodying my invention and then point out the novel features in the appended claims.

Reference is to be had to the accompanying drawings, forming a part of this specification, in which similar characters of reference indicate corresponding parts in all the views.

Figure 1:
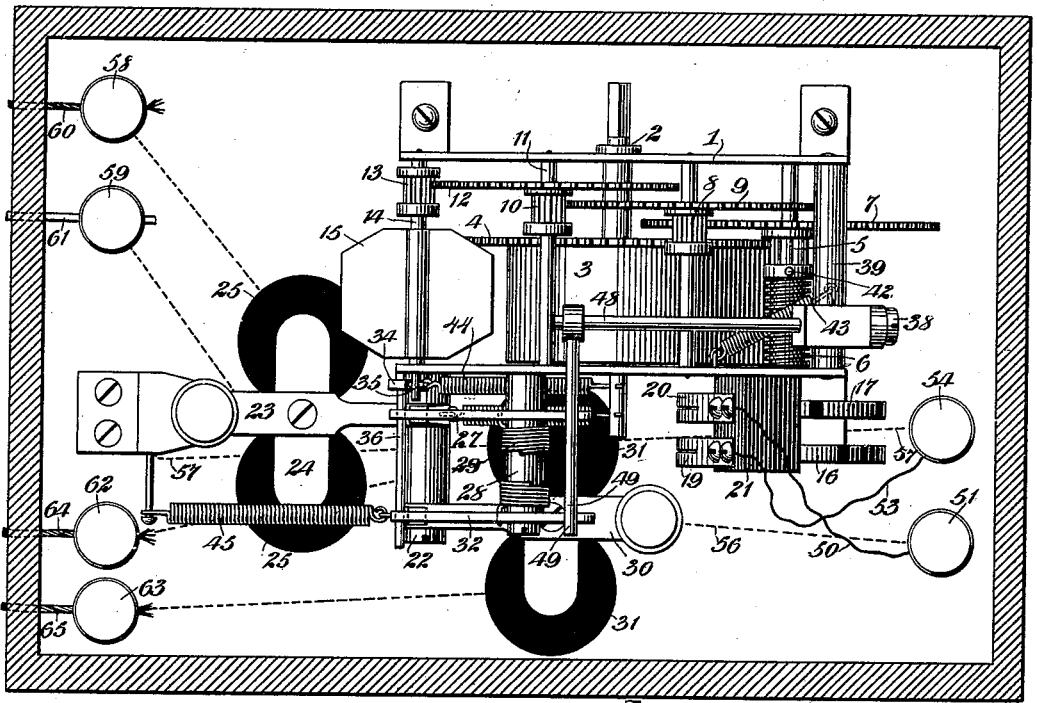
Figure 2:
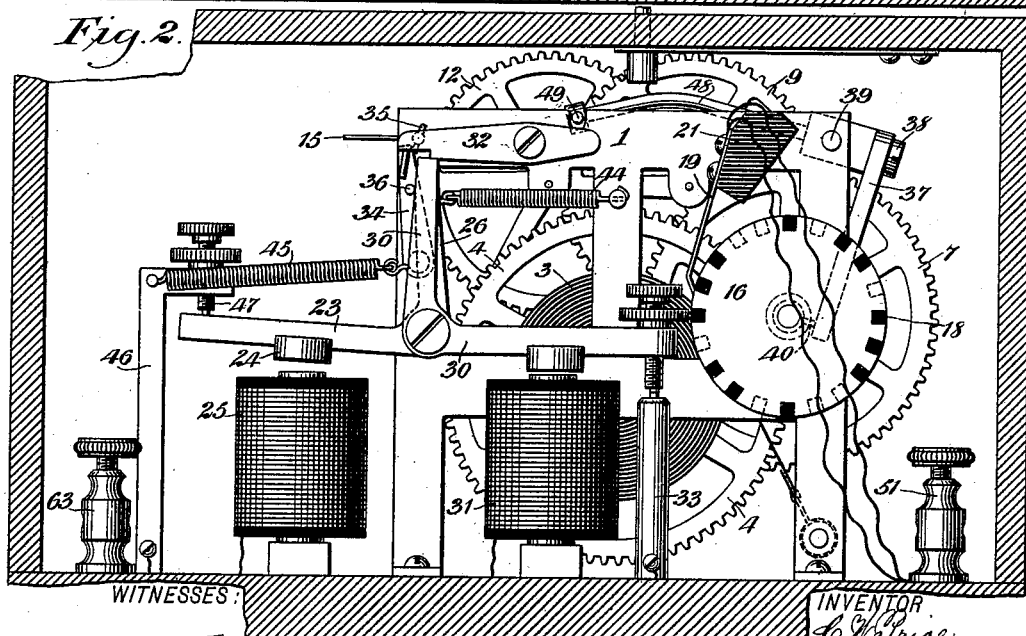
Figure 3:
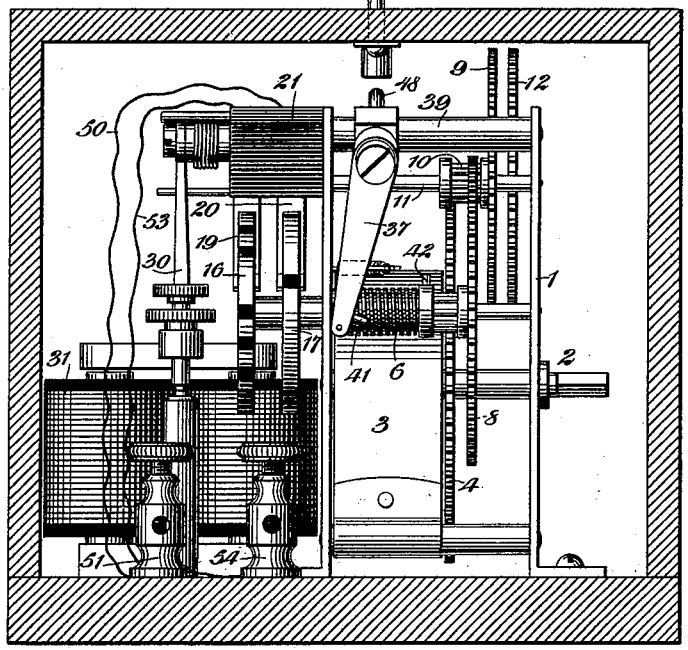
Figure 4:
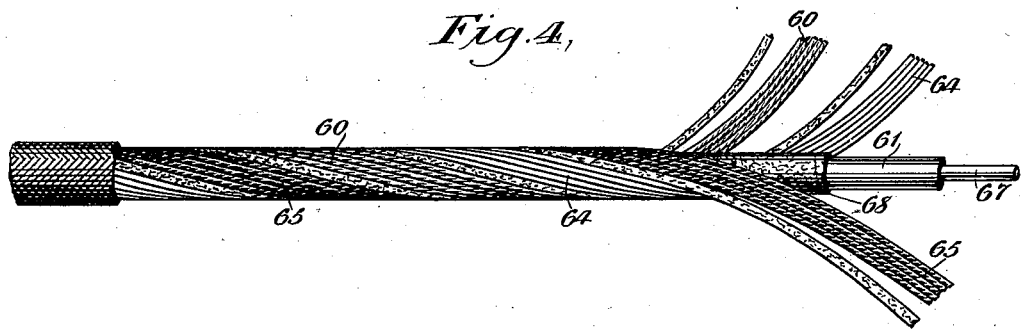

Figure 1 is a plan view of a circuit-controller embodying my invention and showing the casing in section. Fig. 2 is a side elevation thereof and showing the casing in section. Fig. 3 is an end elevation and showing the casing in section. Fig. 4 shows a cable that may be employed. Fig. 5 is a diagrammatic view showing the controller in connection with main wires and the local wires, and Fig. 6 is a plan view illustrating the electrical connections of the parts of the controller.

The controller comprises a motor, here shown as spring-actuated—that is, mounted in a suitable frame 1 is a main shaft 2, adapted at one end to receive a winding-key, and upon this shaft 2 is mounted a coiled spring 3, having one end attached to the frame of the machine and the other end attached to the shaft. Mounted on the shaft 2 is a gear-wheel 4, meshing with a pinion 5 on a screw-shaft 6. On the screw-shaft 6 is a gear-wheel 7, meshing with a pinion 8, on the shaft of which is a gear-wheel 9, meshing with a pinion 10 on the shaft 11, having a gear-wheel 12, which meshes with a pinion 13 on a fan-shaft 14, having bearings in the frame 1 and upon which is mounted a controlling-fan 15.

Mounted on the outwardly-extended end of the screw-shaft 6 are circuit-controlling disks 16 and 17. These controlling-disks 16 and 17 are designed to make and break electrical connections, whereby a signal may be sounded at a central office. Each disk consists of metal and has blocks 18 of insulating material secured in its periphery. Bearing upon the controlling-disk 16 is a brush 19 and bearing upon the disk 17 is a similar brush 20. These brushes are secured to a block 21 of insulating material attached to the frame 1.

Mounted to rock on a stud 22, extended outward from the frame 1, is an armature-lever 23, having an armature 24 coacting with an electromagnet 25. This armature-lever 23 has a vertically-disposed portion 26 normally engaging with a trip 27, mounted to rock on a stud 28, extended outward from the frame 1. The trip 27 is held in yielding engagement with the armature-lever 23 by means of a spring 29, coiled around the stud 28 and having one end attached thereto and the other to the trip. Mounted to rock on the stud 22 is another armature-lever 30, coacting with an electromagnet 31 and having an upwardly-extended portion normally engaging with a spring-pressed trip 32, mounted to rock on the stud 28. The horizontally-disposed portion of the armature-lever 30 is normally in closed connection with a metal post 33, extended upward from the base of the machine.

Pivoted to the frame 1 is a stop-arm 34, designed to be engaged at its upper end with a pin 35 on the extended end of the fan-shaft 14, and thus provide a stop for the motor. From the stop-arm 34 a finger 36 extends laterally and is designed to be engaged by the upwardly-extended portions of the armature-levers 23 and 30.

As a means for automatically stopping the motor after a certain number of rotations of the circuit-controllers shall have been made I employ a lever 37, mounted to swing on a block 38, which is secured to a rock-shaft 39, mounted in the frame 1. The lower end of the lever 37 is provided with a pin 40, which engages between the threads of the screw-shaft 6. This lever 37 is also provided with a laterally-extended pin 41, designed to engage with a pin 42, projected from a collar at the inner end of the screw-shaft 6. The lever 37 is held yieldingly against the screw-shaft by means of a spring 43, attached at one end to said lever and at the other end to the frame 1.

The armature 24 is held normally in an open position by means of a spring 44, connected at one end to the frame 1 and at the other end to the upwardly-disposed portion of the armature-lever. The electromagnet 25 will be in a normally open circuit; but the electromagnet 31 will be in a normally closed circuit, as will be hereinafter described. When the electromagnet 31 is deënergized, the armature-lever 30 will be drawn out of engagement with the post 33 by means of a spring 45, attached at one end to the upwardly-disposed portion of the lever 30 and at the other end to a contact-post 46, having a contact-point 47, designed to be engaged by the lever 23. From the block 38 a rod 48 extends over the machine, and to the end of this rod 48 is attached a trip-arm 49, which extends over and is designed to be engaged by the rear ends of the trip-levers 27 and 32.

From the brush 20 a wire 50 extends to a connection with a binding-post 51, having connection with a main line-wire 52, comprised in a telephone or similar circuit, and from the brush 19 a wire 53 extends to a connection with a binding-post 54, with which the other main wire 55 connects. The contact-post 33 has a wire connection 56 with the binding-post 51 and the binding-post 54 has a wire connection 57 with the contact-carrying post 46. The electromagnet 25 has its terminals in connection with binding-posts 58 and 59, with which the local fire-alarm wires 60 and 61 engage. The electromagnet 31 has its terminals in connection with binding-posts 62 and 63, with which local burglar-alarm wires 64 and 65 engage. These several wires 60, 61, 64, and 65 will preferably be formed in a single cable, such as is illustrated in Fig. 4. This cable consists of a core 61 (represented by the wire 61 in Fig. 1) of fusible material—such, for instance, as lead—and for the purpose of additional conductivity this core may have a copper wire 67 extending longitudinally through it. An insulating material 68 surrounds the core 61, and spirally wound around this insulating material is the series of conductors 60, 64, and 65. The fire-alarm wires 60 and 61 will comprise a battery 69 and the burglar-alarm wires will comprise a battery 70.

When the machine is in its normal position, with the armature-lever 23 in connection with the contact 47, the telephone-circuit, comprising the wires 52 and 55, will be in connection through the binding-post 51, the wire 56, post 33, the armature-lever 30, the armature-lever 23, the post 46, the wire 57, and the binding-post 54. The cable containing the local conductors will be distributed about a building in the usual manner, and should a fire occur the conductors 60 and 61 will be fused together, thus energizing the electromagnet 25. When thus energized, the electromagnet will draw the armature-lever 23 downward, and the vertical portion of this armature-lever, by engaging with the finger 36, will move the holding-arm 34 out of the line of movement of the pin 35, and therefore the motor will operate. The metallic or main circuit is then operated by the motor as follows: Starting from the main-line binding-post 51 the circuit will be through the connections with the post 33, thence through the armature-lever 30, through the motor to the disk 16, and through the brush 19 back to the binding-post 54. This of course will cause the circuit-controlling disk 16 to rotate and make and break the connections to sound an alarm at the central station—such, for instance, as a bell 71, located in a local circuit 72, comprising a battery 73. This local circuit is closed by an armature-lever 74, coacting with an electromagnet 75, having connection with the telephone-wire 52.

During the rotary motion of the motor the lever 37 will be moved toward the inner end of the screw-shaft 6, and when it shall have reached the end of its movement the pin 41 on the lever will be engaged by the pin 42 on the screw-shaft and thus automatically stop the motion of the motor. Of course before the lever 37 shall have reached the limit of its movement the circuit-controlling disk 16 will have made several rotations, thus sounding several continuous alarms.

Should the cable be cut by a burglar or other person, the wires 64 and 65 will of course be separated, and this will open the circuit or deënergize the electromagnet 31, allowing the armature-lever 30 to move upward under the influence of its spring 45, and the upwardly-extended portion of this armature-lever by engaging the finger 36 will move the stop-arm 34 out of the line of movement of the pin 35, as before described, and thus allow the motor to operate. The metallic or main circuit is then operated by the motor, as follows: starting at the main-circuit binding-post 54, thence to the armature-lever 23, through the motor to the brush 20, and thence to the main-line binding-post 51. Should the cable be cut, as before mentioned, the conductors 60 and 61 will of course be short-circuited and the two trips 27 and 32 will be simultaneously operated and a combined burglar-alarm will be sounded at the central office.

The lever 37 may be reset to its normal position at the end of the screw-shaft nearest to the controlling-disk by pushing downward on a push-bar 76, which will engage the rod 48, and by rocking said rod 48 downward the pin 40 will be moved out of engagement with the threads of the screw-shaft 6 and the spring 43 will move the lever back to its normal position.

Having thus described my invention, I claim as new and desire to secure by Letters Patent—

1. An electromechanical controller for an electric circuit, comprising a spring-driven motor, holding devices for said motor, an electromagnet in a normally closed local circuit for operating one of said holding devices, another electromagnet in a normally open local circuit for operating the other of said holding devices, a main circuit, and two circuit-controlling disks for said main circuit and operated by the motor, substantially as specified.

2. An electromechanical controller for an electric circuit, comprising a spring-driven motor, a screw-shaft operated by said motor, a pair of main circuit making and breaking disks on said screw-shaft, a pivoted lever having a pin engaging between the threads of said screw-shaft, a pin extended laterally from said lever, a pin extended from the screw-shaft at its end opposite that upon which the disks are mounted, and adapted to engage with the pin on the lever, means for shifting the lever to its normal position, an electromagnet in a normally closed local circuit operating to release the motor, and an electromagnet in a normally open local circuit also operating to release the motor, substantially as specified.

3. An electromechanical controller for an electric circuit, comprising a spring-driven motor, a pair of circuit making and breaking disks operated by the motor, a fan-shaft comprised in the motor, a stop-lever pivoted to the frame of the motor and adapted to be engaged by said pin, an electromagnet in a normally closed local circuit, an electromagnet in a normally open local circuit, armature levers operated by said magnets and each adapted to engage with a finger extended from the stop-lever, a contact-post normally engaged by the armature-lever of the closed-circuit electromagnet, a connection between said post and a main-line wire, and a connection between the armature-lever of the open-circuit electromagnet and a main-line wire, substantially as specified.

4. An electromechanical controller for an electric circuit, comprising a spring-driven motor, a screw-shaft operated by said motor, main circuit making and breaking disks on the screw-shaft, a pivoted lever having a pin engaging between the threads of said screw-shaft and provided with means for stopping the movement of the shaft and motor, a rock-shaft on which the lever is mounted, a rod extended from said rock-shaft, trip-levers pivoted on a projection from the frame of the device, an arm extended from the rod and adapted to engage with the rear ends of said trips, armature-levers engaged by said trips, a stop-lever operated by said armature-levers, and a pair of local-circuit electromagnets for controlling the armature-levers, substantially as specified.

CHARLES W. PRICE.

Witnesses:
JNO. M. RITTER,
C. R. FERGUSON.